US012731316B2

(12) United States Patent
Tormasov et al.

(10) Patent No.: US 12,731,316 B2
(45) Date of Patent: Sep. 8, 2026

(54) GENERATING A REALISTIC ANIMATED AVATAR OF A USER IN REAL-TIME DURING A TELECONFERENCE

(71) Applicants: Constructor Technology AG, Schaffhausen (CH); Constructor Education and Research Genossenschaft, Schaffhausen (CH)

(72) Inventors: Alexander Tormasov, Hochrhein (DE); Serg Bell, Singapore (SG); Stanislav Protasov, Singapore (SG); Nikolay Dobrovolskiy, Alanya (TR); Laurent Dedenis, Geneva (CH)

(73) Assignee: Constructor Technology AG, Schaffhausen (CH)

(*) Notice: Subject to any disclaimer, the term of this patent is extended or adjusted under 35 U.S.C. 154(b) by 0 days.

(21) Appl. No.: 18/976,898

(22) Filed: Dec. 11, 2024

(65) Prior Publication Data

US 2026/0162342 A1 Jun. 11, 2026

(51) Int. Cl.

| | |
|---|---|
| ***G06T 13/20*** | (2011.01) |
| ***G06F 3/01*** | (2006.01) |
| ***G06T 13/40*** | (2011.01) |
| ***G10L 13/047*** | (2013.01) |
| ***G10L 13/10*** | (2013.01) |
| ***G10L 25/63*** | (2013.01) |

(52) U.S. Cl.

CPC ............ *G06T 13/205* (2013.01); *G06F 3/012* (2013.01); *G06F 3/017* (2013.01); *G06T 13/40* (2013.01); *G10L 13/047* (2013.01); *G10L 13/10* (2013.01); *G10L 25/63* (2013.01)

(58) Field of Classification Search

CPC ....... G06T 13/205; G06T 13/40; G06F 3/012; G06F 3/017; G10L 13/047; G10L 13/10; G10L 25/63

See application file for complete search history.

(56) References Cited

U.S. PATENT DOCUMENTS

| | | | | |
|---|---|---|---|---|
| 11,582,424 | B1 * | 2/2023 | Kasaba | G06V 40/28 |
| 11,620,780 | B2 * | 4/2023 | Lee | G02B 27/0101 345/473 |
| 11,741,651 | B2 * | 8/2023 | Stewart | G06V 10/764 345/473 |

(Continued)

*Primary Examiner* — Grant Sitta

(74) *Attorney, Agent, or Firm* — ArentFox Schiff LLP; Michael Fainberg

(57) ABSTRACT

Disclosed herein are systems and method for generating animated avatars of users in real-time during a teleconference. The method includes training AI avatar generation models to create an avatar of a first user, deploying an AI avatar generation agent on a communication device, collecting sensor data from different sensors associated with the first user and sending the collected sensor data to the communication device of the second user, activating a data processing model and to identify the types of sensor data received from the communication device of the first user and activating the AI avatar generation agent of the second user to execute, on the communication device of the second user, the plurality of AI avatar generation models, and displaying, on the communication device of second user, the animated avatar of the first user synced with the real-time audio of the voice of the first user during the teleconference.

20 Claims, 10 Drawing Sheets

(56) References Cited

U.S. PATENT DOCUMENTS

| | | | | |
|---|---|---|---|---|
| 2013/0155169 | A1* | 6/2013 | Hoover | H04N 7/157 348/E7.083 |
| 2017/0206797 | A1* | 7/2017 | Solomon | G06N 3/006 |
| 2017/0365084 | A1* | 12/2017 | Hayashida | G06F 3/017 |
| 2020/0306640 | A1* | 10/2020 | Kolen | G06N 3/094 |
| 2023/0130287 | A1* | 4/2023 | Zhao | G06T 13/40 345/474 |
| 2023/0223022 | A1* | 7/2023 | Singh | G06T 11/60 704/235 |
| 2024/0046536 | A1* | 2/2024 | Prasad | G06T 11/40 |
| 2024/0078731 | A1* | 3/2024 | Beith | G06T 13/205 |
| 2025/0061634 | A1* | 2/2025 | Huang | G06T 13/40 |

* cited by examiner

600

600

GENERATING A REALISTIC ANIMATED AVATAR OF A USER IN REAL-TIME DURING A TELECONFERENCE

FIELD OF TECHNOLOGY

The present disclosure relates to the field of machine learning, and, more specifically, to systems and methods for generating an animated avatar of a user in real-time during a teleconference.

BACKGROUND

Traditional teleconference systems have long utilized cameras directly from their devices or external camera systems in order to capture and display videos of participants in real-time to simulate face-to-face communication. In addition, teleconference software platforms may also leverage cameras, microphones, and software to facilitate real-time video communication and manage the video and audio stream to ensure synchronization and quality. However, for users who are participating in teleconferences with devices that are not equipped with cameras or without access to camera, they are not able to participate with real-time video in the teleconference. Furthermore, even if a user is participating in a teleconference and has access to cameras, the user may not want to stay stationary in front of the cameras during the teleconference. Thus, there should be a way to create a real-time video with an realistic computer-generated avatar of users in a teleconference without relying on a camera.

SUMMARY

To address the shortcomings of streaming real-time videos of participants in a teleconference who use devices without cameras, the present disclosure describes generating animated avatars of users in real-time during a teleconference without the use of cameras. Some of the technical improvements of the present disclosure is the ability to eliminate the need to utilize a camera for generating and using a realistic avatar of the user for teleconferencing purposes. In particular, the present disclosure applies trained AI models to different data streams from various sensors and/or devices that typically take much less bandwidth and processing power than streaming video from a camera in order to generate realistic avatars of participants in teleconference meetings in real-time.

In one exemplary aspect, a method for generating animated avatars of users during a teleconference is disclosed, the method comprising: training a plurality of AI avatar generation models to create an avatar of a first user, wherein each AI avatar generation model is trained using different types of sensor data; deploying an AI avatar generation agent on a communication device of a second user or on a cloud server; in response to a teleconference call being initiated between a communication device of the first user and a communication device of the second user, collecting sensor data from a plurality of different sensors associated with the first user and sending the collected sensor data to the communication device of the second user, wherein the sensor data comprises at least real-time audio of voice of the first user; activating a data processing model to identify the types of sensor data received from the communication device of the first user and activating the AI avatar generation agent of the second user to execute, on the communication device of the second user, one or more of the plurality of AI avatar generation models, corresponding to the identified types of sensor data, for generating, based at least on the received sensor data, an animated avatar of the first user, wherein the animated avatar simulates at least one of: physical likeness, facial expressions, speech mannerisms, co-speech gestures, and voice of the first user during the teleconference; and displaying, on the communication device of second user, the animated avatar of the first user synced with the real-time audio of the voice of the first user during the teleconference.

In some aspects, the techniques described herein relate to a method, wherein the plurality of different sensors comprises one or more of: a wearable sensor configured to measure a head position or a head movement of the first user, a wearable sensor with interior-facing cameras configured to capture face movement or lip-sync movement of the first user, a wearable Wi-Fi signal strength measurement device configured to measure Wi-Fi strength in accordance with gestures of the first user, a microphone configured to capture the real-time audio of the voice of the first user, and an input device configured to capture text from the first user.

In some aspects, the techniques described herein relate to a method, wherein the plurality of AI avatar generation models to generate the animated avatar of the first user includes at least one or more of: a head position AI recognition model to predict a head position or head movement of the first user based on using the wearable sensor to measure the head position of the first user in relation with a body of the first user when the first user is speaking, wherein the head position AI recognition model is trained to predict the head position using a head position training set comprising of a sequence of images of users speaking and a head position label identifying each head position in the sequence of images; a mimic AI recognition model to predict facial expressions or lip-sync of the first user based on using the wearable sensor with interior-facing cameras to capture face movement when the first user is speaking, wherein the mimic AI recognition model is trained to predict the facial expressions of the first user using a mimic head position training set comprising of a sequence of images of users speaking and a facial expression label identifying a facial expression in the sequence of images; a gesture AI recognition model to predict gestures of the first user based on using the wearable Wi-Fi signal strength measurement device to detect changes in a Wi-Fi field around the first user when the first user is speaking, wherein the gesture AI recognition model is trained to predict the gestures of the first user using a gesture training set comprising of a sequence of images of users and a gesture label identifying a gesture in the sequence of images; a lip-sync AI recognition model to predict a lip-sync of the first user based on using the wearable sensor with interior-facing cameras or the microphone to detect speech patterns when the first user is speaking, wherein the lip-sync AI recognition model is trained to predict lip-sync of the first user using audio files matched to sequence of images of users and a lip-sync label identifying a lip-sync movement audio files matched to the sequence of images; or an emotion AI recognition model to predict emotions of the first user based on using the microphone to capture the voice of the first user, wherein the emotion AI recognition model is trained to predict emotions of the first user using audio files of users and an emotion label identifying an emotion in the audio files; or a voice generation model to generate computer-generated speech for the first user based on using text obtained from an input device of the first user in real-time, wherein the voice generation model is trained to predict speech of the first user using audio files of the first user and a text-to-speech (TTS) model.

In some aspects, the techniques described herein relate to a method, wherein the plurality of AI avatar generation models are trained, stored, and executed on the cloud server.

In some aspects, the techniques described herein relate to a method, wherein the plurality of AI avatar generation models are trained, stored, and executed on a wearable device, invasive implant, non-invasive implant, teleconference device, or edge device.

In some aspects, the techniques described herein relate to a method, further comprising: based on a determination that a Wi-Fi strength of a wearable Wi-Fi signal strength measurement device of the first user does not pass a threshold, displaying, on the communication device of the second user, a basic avatar of the first user without animations along with the real-time audio of the voice of the first user during the teleconference.

In some aspects, the techniques described herein relate to a method, further comprising: based on a determination that the Wi-Fi strength of the wearable Wi-Fi signal strength measurement device of the first user passes the threshold, updating, on the communication device of the second user, the display of the basic avatar to a display of the animated avatar of the first user along with the real-time audio of the voice of the first user during the teleconference.

In some aspects, the techniques described herein relate to a method, wherein the speech mannerisms comprises one or more of: frequency of pauses, length of the pauses, talking speed, tone, or diction.

In some aspects, the techniques described herein relate to a method, wherein the co-speech gestures comprises at least head movement, facial feature movement, gestures, lip-sync movement, and body part movement of the first user.

In some aspects, the techniques described herein relate to a method, wherein the voice comprise at least one of gender, tone, emphasis, emotions, speech defects, and prosody of the first user.

In some aspects, the techniques described herein relate to a method, wherein based on one or more types of sensor data not being available from the communication device of the first user, the AI avatar generation agent uses one or more of the AI avatar generation models to predict the one or more of the physical likeness, facial expressions, speech mannerisms, co-speech gestures, and audio of the first user based on available sensor data or previously collected sensor data.

In some aspects, the techniques described herein relate to a method, further comprising: collecting the sensor data from a plurality of different sensors associated with the first user and sending the collected sensor data to the communication device of the second user based on a determination that a video of the first user is not available.

In some aspects, the techniques described herein relate to a method, wherein the data processing model is deployed on a cloud fog and the AI avatar generation agent are deployed on a cloud.

In one exemplary aspect, a method for generating animated avatars of users during a teleconference is disclosed, the method comprising: training a plurality of AI avatar generation models to create an avatar of a first user, wherein each AI avatar generation model is trained using different types of sensor data; deploying an AI avatar generation agent on a cloud server; in response to a teleconference call being initiated between a communication device of the first user and a communication device of the second user, collecting sensor data from a plurality of different sensors associated with the first user and sending the collected sensor data to the communication device of the second user, wherein the sensor data comprises at least text from the first user; activating a data processing model and of the second user to identify the types of sensor data received from the communication device of the first user and activating the AI avatar generation agent to execute, on the communication device of the second user, one or more of the plurality of AI avatar generation models, corresponding to the identified types of sensor data, for generating, based at least on the received sensor data, an animated avatar of the first user, wherein the animated avatar simulates at least one of: physical likeness, facial expressions, speech mannerisms, co-speech gestures, and voice of the first user during the teleconference, wherein the one or more of the plurality of AI avatar generation models comprises at least a voice generation model configured to generate computer-generated speech for the first user from text of the first user using the AI avatar generation agent on the cloud server; and displaying, on the communication device of second user, the animated avatar of the first user with the computer-generated speech for the first user synced with the text obtained from the first user in real-time during the teleconference.

According to one aspect of the disclosure, a system is provided for generating animated avatars of users in real-time during a teleconference, the system comprising at least one memory; and at least one hardware processor coupled with the at least one memory and configured, individually or in combination to: train a plurality of AI avatar generation models to create an avatar of a first user, wherein each AI avatar generation model is trained using different types of sensor data; deploy an AI avatar generation agent on a communication device of a second user or on a cloud server; in response to a teleconference call being initiated between a communication device of the first user and a communication device of the second user, collect sensor data from a plurality of different sensors associated with the first user and sending the collected sensor data to the communication device of the second user, wherein the sensor data comprises at least real-time audio of voice of the first user; activate a data processing model to identify the types of sensor data received from the communication device of the first user and activating the AI avatar generation agent of the second user to execute, on the communication device of the second user, one or more of the plurality of AI avatar generation models, corresponding to the identified types of sensor data, for generating, based at least on the received sensor data, an animated avatar of the first user, wherein the animated avatar simulates at least one of: physical likeness, facial expressions, speech mannerisms, co-speech gestures, and voice of the first user during the teleconference; and display, on the communication device of second user, the animated avatar of the first user synced with the real-time audio of the voice of the first user during the teleconference.

In one exemplary aspect, a non-transitory computer-readable medium is provided storing a set of instructions thereon for generating animated avatars of users in real-time during a teleconference, wherein the set of instructions comprises instructions for: training a plurality of AI avatar generation models to create an avatar of a first user, wherein each AI avatar generation model is trained using different types of sensor data; deploying an AI avatar generation agent on a communication device of a second user or on a cloud server; in response to a teleconference call being initiated between a communication device of the first user and a communication device of the second user, collecting sensor data from a plurality of different sensors associated with the first user and sending the collected sensor data to the communication device of the second user, wherein the sensor data comprises at least real-time audio of voice of the first user; activating a data processing model to identify the types of sensor data received from the communication device of the first user and activating the AI avatar generation agent of the second user to execute, on the communication device of the second user, one or more of the plurality of AI avatar generation models, corresponding to the identified types of sensor data, for generating, based at least on the received sensor data, an animated avatar of the first user, wherein the animated avatar simulates at least one of: physical likeness, facial expressions, speech mannerisms, co-speech gestures, and voice of the first user during the teleconference; and displaying, on the communication device of second user, the animated avatar of the first user synced with the real-time audio of the voice of the first user during the teleconference.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

Like reference numbers and designations in the various drawings indicate like elements.

DETAILED DESCRIPTION

Figure 1:
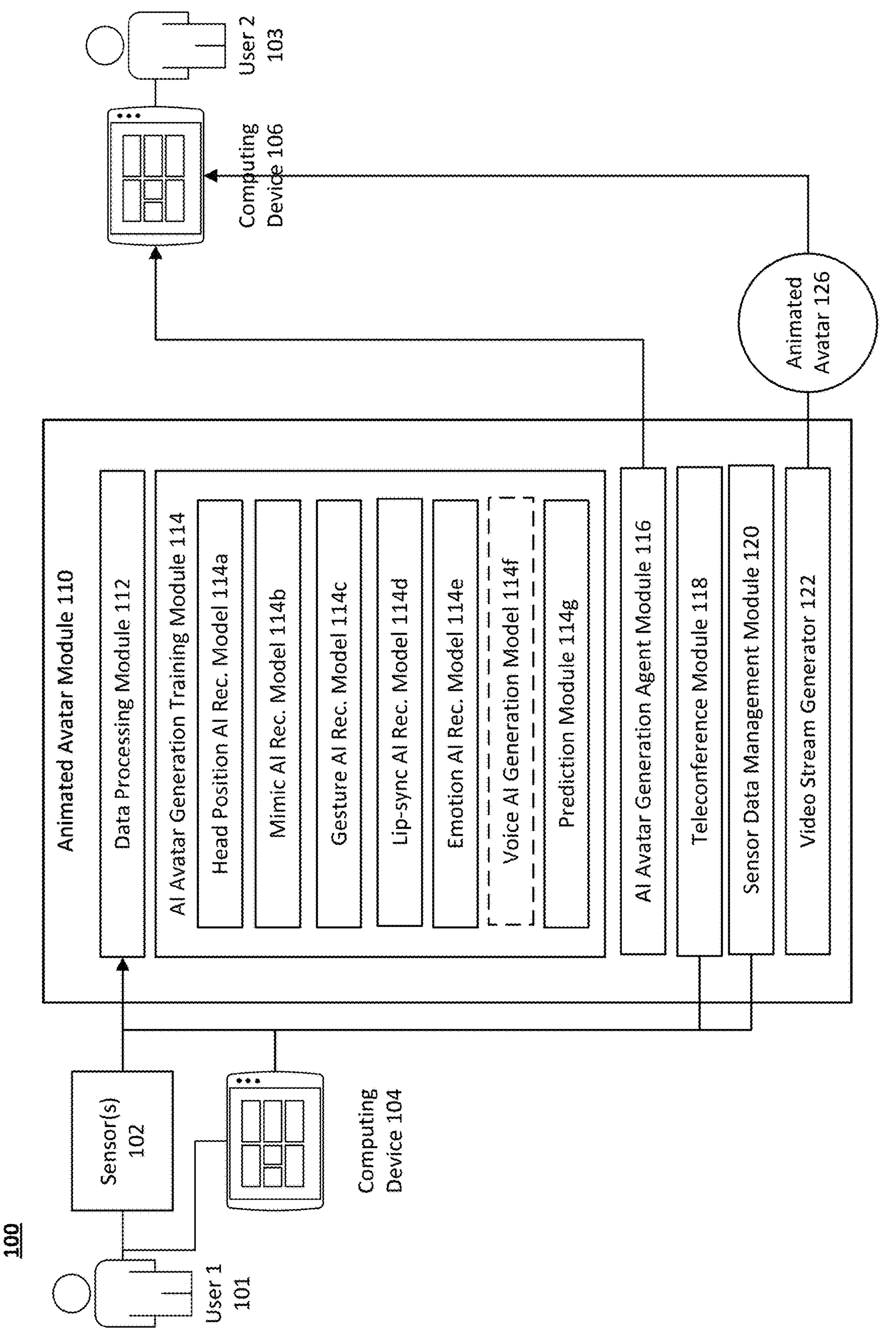
FIG. 1 is a block diagram illustrating a system for generating animated avatars of users in real-time during a teleconference according to aspects of the present disclosure.

Exemplary aspects are described herein in the context of a system, method, and computer program product for generating animated avatars of users in real-time during a teleconference using neural networks. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes various aspects of generating and displaying animated avatars of users in real-time during a teleconference using artificial intelligence (AI) recognition models. One aspects involves training different AI avatar generation models to predict visual and/or audio appearances (e.g., physical likeness, facial expressions, speech mannerisms, co-speech gestures, or voice) of a user speaking during the teleconference. A second aspect involves creating a realistic avatar of a first user based on the visual and/or audio predictions using different types of sensor data. Each AI avatar generation model is trained to predict a different visual and/or audio appearance used to generate the realistic avatar based on a particular type of input or device. For example, a head position AI recognition model may predict a head position or head movement of a user based on the user wearing earphones to measure the head position of the user relative to their body. A third aspect involves activating a data processing model to identify the available types of sensor data (e.g., with no cameras) received from a communication device of a user and using the available sensor data to generate an animated avatar of the user that is synced with real-time audio of a voice of a user during a teleconference. In this way, a user may view a video of a computer-generated realistic avatar representing a user participating in the teleconference such that the computer-generated realistic avatar is synced up to the voice of the speaker and appears to be speaking to the user.

By processing different accessible data streams captured from devices of a user, the AI recognition models may recognize head positions, facial expressions, gestures, lip syncing, or emotions from real time audio (or text message) from devices of a user that is speaking and predict the movements and expressions of the avatar to appear as though the animated avatar is speaking in real-time. Accordingly, the AI recognition models may also help “fill in” actions and emotions of the speaker by predicting how the user would actually behave and move when speaking as if the user is in the room with all the participants. In this way, since real-time video data transmission is expensive, the amount of transmitted data may be reduced by not sending real-time video and instead relying on other available data streams from the various sensors. This also allows user to have collective teleconferencing without using any cameras.

Turning now to the figures, example aspects are depicted with reference to one or more components described herein, where components in dashed lines may be optional.

FIG. 1 is a block diagram illustrating a system 100 configured to train and generate animated avatars of users in real-time during a teleconference. The system 100 may be used to generate an animated avatar 126 that is synced to real-time audio of the first user 101 captured by a computing device 104 and/or using different sensor(s) 102. Specifically, the animated avatar module 110 may predict and generate the animated avatar 126 of the first user 101 using trained AI recognition models to generate and control realistic animated avatars that are synced to audio of the first user 101 in real time. The animated avatar 126 will be displayed on the computing device 106 of the second user 103 such that the animated avatar 126 will be animated to look, behave, and act like the first user 101 in real-time based on the real-time audio of the first user 101 or text from the first user 101. This provides a way to provide video of a user or a digital representation of a user participating in a teleconference without using any cameras.

The system 100 includes a plurality of sensors 102 and a computing device 104 corresponding to a first user 101, an animated avatar module 110, and a computing device 106 controlled by a second user 103. As an example and will be described in more detail in FIG. 3, the animated avatar module 110 may be hosted on a cloud server or allocated at an edge device or a device with teleconferencing capabilities. In some examples, the animated avatar module 110 may be allocated directly on the computing device 106 of the second user 103. In some examples, the animated avatar module 110 is implemented as part of an avatar client agent.

For example, a first user 101 may install the avatar client agent (or access the avatar client agent on the cloud server) and trains the various AI recognition models from the AI avatar generation training module 114 deployed on the cloud server for creating his or her avatar. In some examples, the AI avatar generation training module 114 may implement a standard training mechanism where the first user 101 follows instructions and speaks to a computing device. After training the avatar for the first user, the first user 101 may invite the second user 103 to a teleconference by sending an invitation to the teleconference. The invitation to the teleconference may include an installation to the avatar software agent or connect the second user 103 to a virtual server hosting the avatar software agent.

As shown in system 100, after training the AI recognition models and during a teleconference, each sensor 102 may capture a different type of data of the first user 101. As a non-limiting example, the sensors 102 may include at least one of earphones for predicting head position of the first user 101, glasses with interior facing camera to predict facial expressions of the first user 101, a wi-fi measurement device or a wearable device worn by the first user 101 to capture gestures of the first user 101, and/or a microphone to capture audio of the first user 101. Although these sensors are listed, one skilled in the art will appreciate that any number of or types of sensors may be used. The computing device 104 and/or computing device 106 may be any computing device capable of participating in teleconferences.

The glasses with interior facing camera to predict facial expressions of the first user 101 may be configured to capture videos of particular portions of a user's face for later reconstruction. In some aspects, a plurality of different sensors may be used to define a position of a user's head in relation to the body of the user. In this way, when building an animated avatar that represents a user in a teleconference environment, accurately tracking the position of the user's head in relation to their body is essential for making the avatar's movements realistic. To achieve this, a combination of different sensors can be employed. These sensors help capture the head's orientation, position, and movement relative to the rest of the body. Common sensors types may include Inertial Measurement Units (IMUs) to track how the head is moving and orienting in 3D space or track the body's position allowing the system to compute the relative position of the head to the body. In some aspects, magnetic or electromagnetic tracking may be place on the head or body to detect changes in the magnetic field providing 3D positional and orientation data. In some aspects, Light Detection and Ranging (LiDAR) systems may provide highly accurate positional data of the user's head relative to the body and the surrounding environment. In some aspects, wearable proximity sensors may be placed on the head and shoulders to detect changes in distance and orientation between the head and the torso to determine relative head movement in relation to the user's torso such as tilting or rotating the head. In some aspects, a microphone array may be used to reconstruct a user's position based on sound by leveraging properties such as sound level differences, time of arrival (TOA), time of difference (TDOA), and echo information.

In some examples, the system 100 may include an animated avatar module 110 configured to process accessible data streams from the different sensor(s) 102 and computing device 104 of the first user 101, recognize attributes of the first user 101 such as head positioning, facial expressions, gestures, lip-sync models, or speech generation, and generate a real-time video with an animated avatar 126 synced to the voice of the first user 101. The computing device 104 captures the voice and attributes and characteristics of the first user 101 as well as facilitates teleconferencing software. Similarly, the computing device 106 for the second user 103 may be configured to display a real-time animation of the animated avatar 126 of the first user 101 synced to the voice of the first user 101. The computing device 104 and/or computing device 106 may individually or work together to execute a plurality of modules in the animated avatar module 110 that together make up at least a data collection, analysis, training, and synchronization system. The animated avatar module 110 may include at least a data processing module 112, an AI avatar generation training module 114, an AI avatar generation agent module 116, a teleconference module 118, a sensor data management module 120, and a video stream generator module 122.

The animated avatar module 110 may be hosted on cloud server. Specifically, as shown in more detail in FIG. 3, the portions of the animated avatar module 110 may be hosted or allocated on different devices. For example, the data processing module 112 may be hosted on a cloud fog computing system and the AI avatar generation agent module 116 may be hosted on a cloud system. In some examples, the data processing module 112 and/or the AI avatar generation agent module 116 may be allocated at teleconferencing devices (e.g., computing device 104, computing device 106, wearable device, television, tactile device), an edge device, or a cloud server. In some devices the teleconferencing devices may be wearable devices, invasive implants, or non-invasive implants (e.g., direct connection to the brain of the wearer).

In some examples, the animated avatar module 110 is configured to create the animated avatar 126 of the first user 101 (e.g., speaker) directly on the computing device 106 of the second user 103 (e.g., listener device). In some examples, the animated avatar module 110 is configured to create the animated avatar 126 of the fuser user 101 on a cloud server, which is then accessed by the computing device 106 of the second user 103.

The computing device 106 may execute a data processing module 112 to collect and obtain the accessible data streams captured from the sensor(s) 102 and/or computing device 104 of the first user 101. These types of accessible data streams work individually or together to replace (or supplement) a conventional camera used for video conferencing. Instead, data processing module 112 is configured to obtain and process the accessible data streams to create a real-time video of a realistic animated avatar 126 of the first user 101 for display on the computing device 106 of the second user 103. For example, the data processing module 112 may collect the raw data from the sensor(s) 102 and/or computing device 104 and transmits the raw data to the computing device 106 of the second user 103 or a cloud server. In addition, in configurations where cameras may be available to capture the first user 101 during a video conferencing session, the first user 101 may not need to stay stationary in front their cameras and can move around freely without any interruption in real-time video of the realistic animated avatar 126.

The computing device 106 may also execute at least an AI avatar generation training module 114 including at least one of: a head position AI recognition model 114*a*, a mimic AI recognition model 114*b*, a gesture AI recognition model 114*c*, a lip-sync AI recognition model 114*d*, an emotion AI recognition model 114*e*, an optional voice AI generation model 114*f*, and a prediction module 114*g*. An AI recognition model is a type of machine learning model designed to identify and classify objects, patterns, or features within data. These AI recognition models are trained on large datasets to recognize specific types of inputs, such as images, text, audio, or video. The AI recognition models may include image recognition models that may include at least object detection models, image classification models, facial recognition models, natural language processing, or sound classification.

In order to train the AI recognition models, the AI recognition models work by first obtaining and/or collecting large datasets and labeling the datasets to train the respective model for a particular purpose. For example, an image recognition model may be trained on thousands of labeled images. Next, the AI recognition model extracts relevant features from the input data. The model is then trained using machine learning algorithms. During training, the model learns to associate specific features with particular labels or categories. The model may then be evaluated on a separate dataset to test its accuracy and performance. Once trained and tested, the model can then be deployed to perform recognition tasks on new, unseen data (e.g., real-time audio) from the first user 101. More detail about the training procedure will be described in FIGS. 2 and 4A-4B.

The computing device 106 or a cloud server may execute the animated avatar module 110 comprising one or more AI recognition models (e.g., the head position AI recognition model 114*a*, the mimic AI recognition model 114*b*, the gesture AI recognition model 114*c*, the lip-sync AI recognition model 114*d*, the emotion AI recognition model 114*e*), optional voice AI generation model 114*f*, and a prediction module 114*g*. The AI recognition models may further work in conjunction with each model to generate an animated avatar 126 that includes predictions of one or more of physical likeness, facial expressions, speech mannerisms, and co-speech gestures of the first user during the teleconference. All of these predictions (e.g., which serves as the outputs of the AI recognition models from the AI avatar generation training module 114) may be collected and analyzed in a prediction module 114*g* to generate an animated avatar 126.

An AI recognition model is a type of AI system designed to identify and classify objects, patterns, or features within data. These model are trained using machine learning techniques on large datasets to recognize specific types of inputs such as images, text, audio, or video. The AI recognition models create an adaptive system that computers use to learn from their mistake and improve continuously by comprehending unstructured (or structured) data and make observations without explicit training. With AI recognition models, computers may predict at least one of physical likeness, facial expressions, speech mannerisms, and co-speech gestures of the first user during a teleconference based on collection of sensor data. However, the AI recognition models listed in the AI avatar generation training module 114 must first go through training to teach the AI recognition models to perform their respective specific tasks.

In general, the AI avatar generation training module 114 may comprise one or more machine learning algorithms, which can broadly be categorized into three main types: supervised learning, unsupervised learning, and reinforcement learning.

Supervised learning is effective for tasks such as classification (assigning inputs to predefined categories) and regression (predicting continuous values). It relies on the availability of labeled data for both training and evaluation phases. In supervised learning, the AI avatar generation training module 114 trains the algorithm on a labeled dataset, where each input has a corresponding output. The goal is to learn a mapping function from inputs to outputs, allowing the algorithm to make predictions or classifications on new, unseen data. The process typically involves the following steps: training, model building, prediction, feedback, and adjustment. In the training phase, the AI avatar generation training module 114 provides the algorithm with a training dataset including input-output pairs. The algorithm learns the mapping function that relates inputs to outputs through an iterative process, adjusting its internal parameters based on the provided examples. During model building, the algorithm creates a model that can generalize from the training data to make predictions on new, unseen data. The model's complexity varies based on the algorithm used. For example, the model may be a simple linear regression model or a complex neural network. During the prediction phase, the AI avatar generation training module 114 inputs test inputs (i.e., inputs with known outputs) into the model, which generates predictions or classifications based on what it has learned during training. The accuracy of predictions is evaluated by comparing them to the known outputs in a validation or test dataset. During the feedback and adjustment phase, the AI avatar generation training module 114 refines the model based on feedback from its predictions. If the predictions differ from the actual outputs, the algorithm adjusts its internal parameters to minimize the errors. The performance of the trained model is assessed using metrics such as accuracy, precision, recall, etc., depending on the nature of the problem.

Unsupervised learning is valuable for tasks where the goal is to explore the inherent structure of the data, identify hidden patterns, or pre-process data for further analysis. It doesn't require labeled examples but relies on the algorithm's ability to discern meaningful structures within the input data. Unsupervised learning deals with unlabeled data, aiming to discover patterns, structures, or relationships within the dataset. Clustering and dimensionality reduction are common tasks in unsupervised learning, helping to reveal inherent structures without predefined target labels. The typical process for unsupervised learning includes: data collection, analysis (e.g., using clustering, dimensionality reduction, etc.) and association. For example, the AI avatar generation training module 114 receives a dataset including only input features without corresponding output labels. The AI avatar generation training module 114 then performs exploratory data analysis to understand the inherent structure of the data. Common techniques in this analysis include statistical measures, clustering, and dimensionality reduction. For example, in clustering, the algorithm groups similar data points together based on certain features. Algorithms including, but not limited to, k-means clustering and hierarchical clustering are commonly used for grouping. In dimensionality reduction, the algorithm reduces the number of input features while retaining essential information. For example, the algorithm may use techniques like Principal Component Analysis (PCA) or t-distributed Stochastic Neighbor Embedding (t-SNE) for dimensionality reduction. During the association phase, the algorithm discovers relationships or associations between variables in the analyzed data. In some aspects, unsupervised learning is used in generative neural networks (e.g., generative adversarial networks (GANs)) to generate new data points similar to the existing dataset once the characteristics of the existing dataset are learned.

Reinforcement learning is applied in scenarios where the optimal decision-making strategy is learned through trial and error, without explicit guidance. It finds applications in various domains, including robotics, game playing, and autonomous systems. More specifically, reinforcement learning involves an agent learning to make decisions by interacting with an environment. The agent receives feedback in the form of rewards or penalties based on its actions, allowing it to learn optimal strategies through trial and error. The primary components of reinforcement learning are as follows: agent, environment, state, action, reward, exploration and exploitation, learning policy, and value function. An agent is the entity that takes actions in the environment. It's the learner in the system. The environment is the external system with which the agent interacts. It provides feedback to the agent based on the actions taken. The state is a representation of the current situation or configuration of the environment. Actions are the moves or decisions that the agent can take within the environment. A reward is a numerical signal that indicates the immediate benefit or cost of the agent's action. The agent's objective is to maximize the cumulative reward over time. The reinforcement learning process typically involves the following steps. The agent explores the environment to discover the most rewarding actions (exploration) and exploits its current knowledge to take actions it believes will yield the highest cumulative reward (exploitation). The agent learns a policy, which is a strategy that maps states to actions, based on the observed rewards and its exploration-exploitation trade-offs. The agent may also learn a value function, estimating the expected cumulative reward from a given state or state-action pair.

In machine learning, training involves optimizing the model's parameters to minimize a chosen objective function, often a loss function. Some training formulas and concepts that the AI avatar generation training module 114 may execute include linear regression loss, logistic regression loss, reinforcement learning, and neural network loss.

AI avatar generation training module 114 may comprise one or more neural networks, which are a class of machine learning models inspired by the structure and functioning of the human brain. They consist of interconnected nodes, called neurons or artificial neurons, organized into layers. Neural networks are capable of learning complex patterns and representations from data. The neural network executed by the AI avatar generation training module 114 may be one of the following: encoder/decoder transformer neural network, convolution neural network (CNN), recurrent neural network (RNN), long short-term memory (LSTM) network, gated recurrent unit (GRU) network, autoencoder, generative adversarial network (GAN).

A transformer is a deep learning architecture used in large language models (LLMs). The transformer has an encoder/decoder structure with numerous stacked multi-head attention layers and feed forward network layers. This architecture allows the model to process and generate text effectively, capturing long-range dependencies and contextual information. Transformer are well-suited for tasks like natural language processing, and image classification and generation. Common examples of transformer models are generative pre-trained transformer (GPT) and Bidirectional Encoder Representations from Transformers (BERT).

A CNN is specialized for processing grid-like data, such as images, and employs convolutional layers to learn spatial hierarchies of features, reducing the need for manual feature engineering. CNNs are well-suited for tasks like image classification, object detection, and image generation.

An RNN is designed for sequential data, where the order of inputs matters. An RNN includes loops in the network architecture to allow information to persist, and is useful for tasks like natural language processing, speech recognition, and time-series prediction.

A LSTM network is an extension of an RNN designed to overcome the vanishing gradient problem. LSTMs have memory cells that can store and retrieve information over long sequences, making them effective for capturing long-term dependencies in sequential data.

A GRU Network is similar to LSTMs and are another type of RNN with mechanisms to address the vanishing gradient problem. GRUs have a simpler architecture with fewer parameters compared to LSTMs.

An autoencoder is a type of neural network used for unsupervised learning and dimensionality reduction, and consists of an encoder that compresses input data into a lower-dimensional representation (encoding) and a decoder that reconstructs the original input from the encoding.

A GAN comprises a generator and a discriminator trained simultaneously through adversarial training. The generator aims to generate realistic data, while the discriminator tries to distinguish between real and generated data. A GAN is widely used for image and content generation tasks.

The computing device 106 may also execute an AI avatar generation agent module 116. The AI avatar generation agent module 114 is configured to generate the animated avatar 126 in real-time on the computing device 106 of the second user 103 (e.g., the listener device) based on inputting the accessible data streams from the first user 101 into the various trained AI recognition models using the available sensor(s) 102 of the first user 101. As shown in FIG. 1, the AI avatar generation agent module 116 predicts and generates an animated avatar 126 by involving a sophisticated process of data collection, model training, and fine-tuning to ensure the animated avatar 126 effective emulates the first user when the first user is speaking during a teleconference.

The computing device 104 and/or computing device 106 may also execute an teleconference module 118. The teleconference module 118 is configured to initiate installation of an avatar client agent and/or invite users to a teleconference call. In some aspects, the teleconference module 118 may be coupled to the computing device 106 for the second user 103.

The computing device 106 may also execute a sensor data management module 120 may work in conjunction with the data processing module 112 to collect and determine the types of sensor data that is available from the computing device 104 and/or the sensor(s) 102 of the first user 101. In some examples, the AI avatar generation agent module 116 may use one or more of the trained AI avatar generation training modules to predict the one or more of the physical likeness, facial expressions, speech mannerisms, co-speech gestures, and audio of the first user 101 based on available sensor data or previously collected sensor data of the various sensor(s) 102.

The computing device 106 may also execute a Wi-Fi management module (not pictured). In some examples, the Wi-Fi management module may be configured to determine the signal strength of the Wi-Fi channels of the computing device 106 of the second user 103 and/or the computing device 104 or the first user 101. For example, if the W-Fi signal strength of the computing device 106 and/or computing device 104 does not pass a threshold, then the animated avatar module 110 may generate a basic or "bare-bones" avatar of the first user 101 without animations or other specific features of the first user during the teleconference. Based on a determination that the Wi-Fi strength of the computing device 106 and/or computing device 104 passes the threshold, then the animated avatar module 110 may update the basic or "bare-bones" avatar of the first user 101 to a realistic animated avatar 126 with animations that are synced to the first user 101.

The computing device 106 may also execute a video stream generator module 122. The video stream generator module 122 may be configured to generate and playback an animated avatar 126 that is synced up to the voice and/or text messages of the first user 101. The video stream generator module 122 may also be configured to synchronize the audio and/or speech of the first user 101 to the animations of the animated avatar 126 in order to simulate the first user 101 speaking to the users in the teleconference in real-time with audio.

Figure 2:
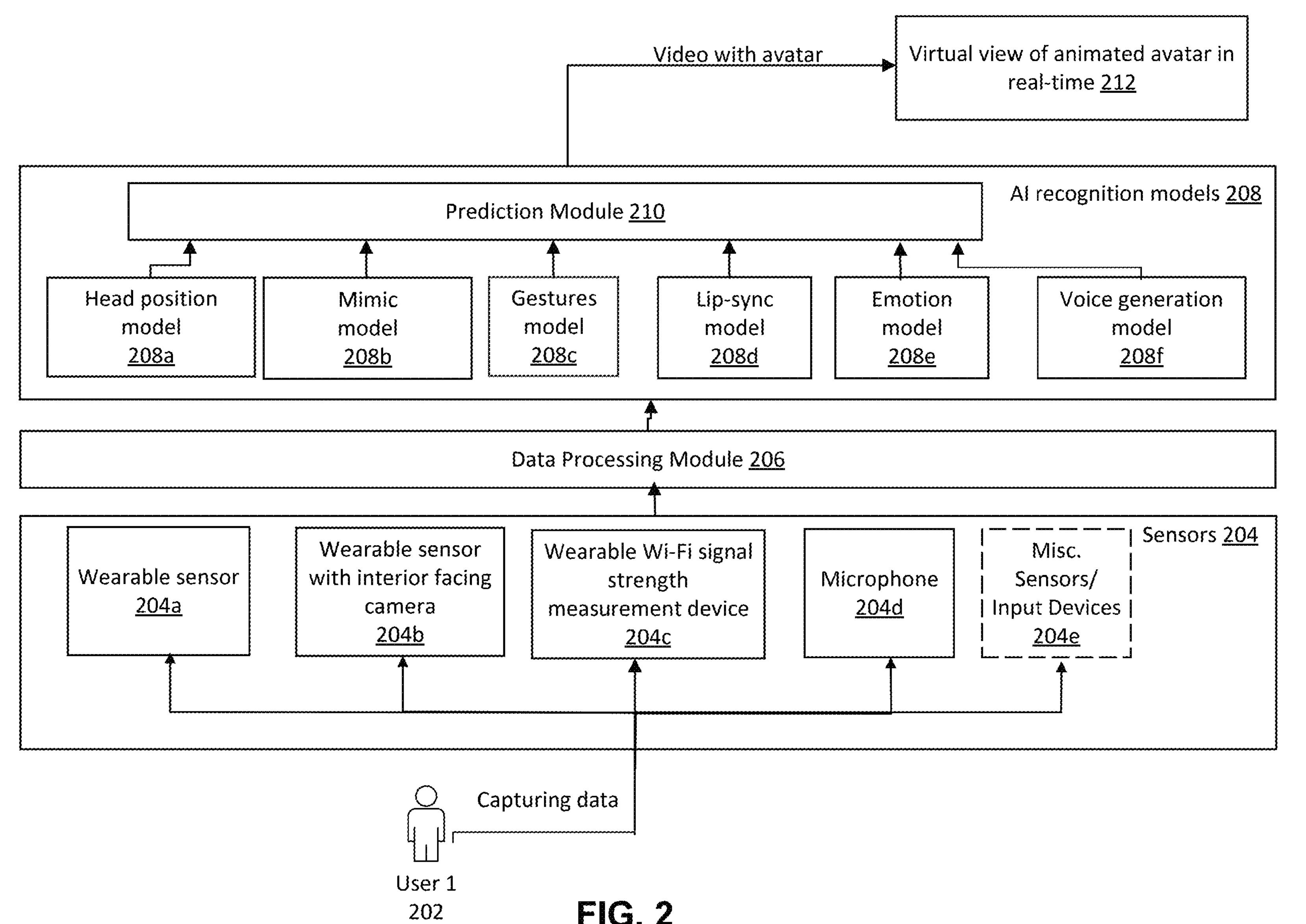
FIG. 2 is a diagram illustrating an approach of generating animated avatars of users in real-time based on multiple data streams according to aspects of the present disclosure.

FIG. 2 is an example 200 illustrating an overview of generating an AI animated avatar model using trained AI recognition models. Example 200 of FIG. 2 illustrates how accessible data streams captured from various sensors 204 (e.g., sensor(2) 102 from FIG. 1) are processed in real-time by a data processing module 206 (e.g., data processing module 112 from FIG. 1) and input into individual AI recognition models 208 (e.g., AI recognition models in AI avatar generation training module 114) to generate a virtual view of the animated avatar of a user speaking in the teleconference 212.

As shown in example 200 of FIG. 2, the data of the first user 202 may be captured by various sensors. The various sensors may include at least one of: a wearable sensor 204*a* (e.g., headphones, etc.) configured to measure a head position or head movement of the first user 202, a wearable sensor with an interior facing camera 204*b* (e.g., smart glasses) configured to capture face movement and/or lip-sync movement of the first user 202, a wearable Wi-Fi signal strength measurement device 204*c* configured to measure Wi-Fi strength in accordance with gestures of the first user 202, a microphone 204*d* configured to capture the real-time audio of the voice of the first user 202, and miscellaneous sensors and/or input devices 204*e* configured to capture text from the first user 202.

The raw data collected by the sensors 204 is collected and processed by a data processing module 206 (e.g., data processing module 112 from FIG. 1) to identify the types of sensor data received from the sensors and input the data into the AI recognition models 208 (e.g., AI avatar generation training module 114 from FIG. 1). The various AI recognition models 208 are selected and activated based on the available types of sensor data available from the first user 202.

The various AI recognition models 208 may include at least one of a head position model 208*a*, a mimic model 208*b*, a gestures model 208*c*, a lip-sync model 208*d*, an emotion model 208*e*, and a voice generation model 208*f*. A corresponding AI recognition model will be activated based on the available type of data from the sensors 204.

For example, the head position model 208*a* (e.g., head position AI recognition model 114*a* from FIG. 1) may predict a head position or head movement of the first user 202 based on using the wearable sensors 204*a* (e.g., headphones) to the measure the head position of the first user 202 in relation with a body of the first user 202 when the first user 202 is speaking. In some examples, the head position model 208*a* may be trained to predict the head position of the first user 202 using a head position training set comprising of a sequence of images of people speaking and a head position label identifying each head position in the sequence of images.

As another example, the mimic model 208*b* may predict facial expressions, face movement, and/or lip-sync of the first user based on using wearable sensors with an interior facing camera 204*b* (e.g., smart glasses) to capture face movement when the first user 202 is speaking. In some examples, the mimic model 208*b* is trained to predict the facial expressions of the first user 202 using a mimic head position training set comprising of a sequence of images of users speaking and a facial expression label identifying a facial expression in the sequence of images.

As another example, the gestures model 208*c* may predict gestures of the first user 202 based on using a wearable Wi-Fi signal strength measurement device 204*c* configured to detect changes in a Wi-Fi field around the first user 202 when the first user 202 is speaking. In some examples, the gestures model 208*c* is trained to predict the gestures of the first user using a gesture training set comprising of a sequence of images of users and a gesture label identifying a gesture in the sequence of images.

As another example, the lip-sync model 208*d* may predict a lip-sync of the first user 202 based on using data available from wearable sensors with an interior facing camera 204*b* (e.g., smart glasses) and the microphone 204*d* to detect speech patterns when the first person is speaking. In some examples, the lip-sync AI recognition model is trained to predict lip-sync of the first user using audio files matched to sequence of images of users and a lip-sync label identifying a lip-sync movement audio files matched to the sequence of images.

As another example, the emotion AI recognition model 208*e* may predict emotions of the first user based on using data obtained from the microphone 204 to capture the voice of the first user 202. In some examples, the emotion AI recognition model is trained to predict emotions of the first user using audio files of users and an emotion label identifying an emotion in the audio files.

As yet another example, the voice generation model 208*f* may generate computer-generated speech for the first user based on using text obtained from an input device 204*e* (e.g., computing device 104 from FIG. 1) of the first user 202. In some examples, the voice generation model 208*f* is trained to predict and generate speech of the first user 202 based on using a text-to-speech (TTS) model and audio files of the first user 202. The TTS model is configured to generate speech from text and enables machines to "speak" in a natural and intelligible manner.

The TTS model may include at least text analysis for linguistic processing to convert written text into a form that can be spoken (e.g., expanding abbreviations, numbers, or special characters and analyze the grammatical structure of the text to determine the correct pronunciation and prosody (intonation, stress, and rhythm); phonetic analysis for converting the normalized text into a sequence of phonemes; prosody generation for determining an appropriate pitch, duration, and intensity for each phoneme to produce natural-sounding speech, and/or a waveform synthesis configured to convert the phonetic and prosodic information into an audio waveform that can be played back as speech. It should be noted that any type of TTS model or framework known in the art may be utilized in example 200.

The prediction module 210 is configured to analyze the various predictions generated by each available AI recognition model 208 and combine the predictions into a virtual view of the animated avatar (e.g., animated avatar 126 from FIG. 2) in real-time 212. The animated avatar may simulate at least one of: physical likeness, facial expressions, speech mannerisms, co-speech gestures, and voice of the first user 202 using the combined predictions during a teleconference.

Figure 3:
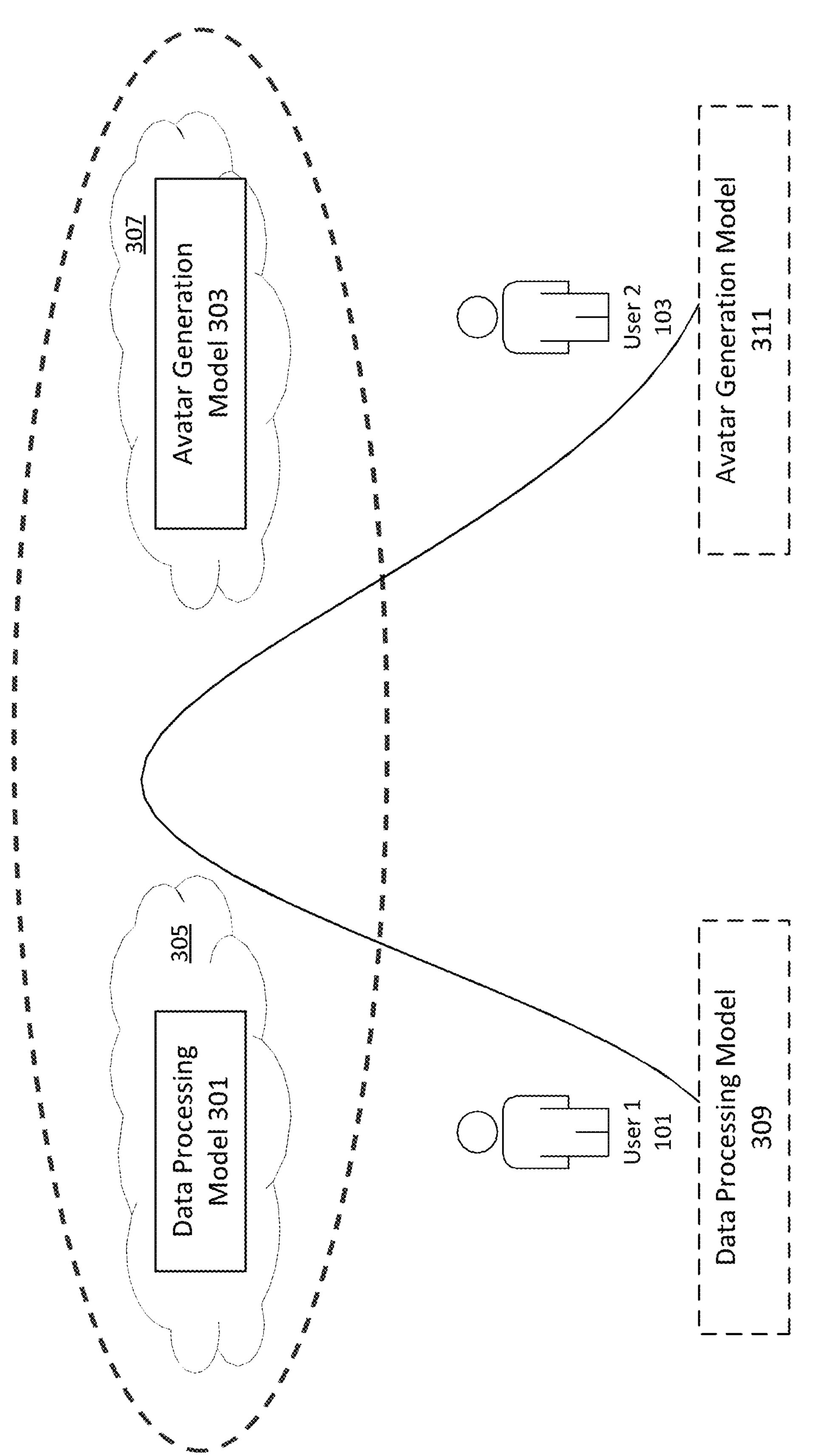
FIG. 3 is a diagram of an implementation of a data processing model and an avatar generation model according to aspects of the present disclosure.

FIG. 3 is a diagram of an implementation of data processing model and an avatar generation model according to aspects of the present disclosure. As shown in example 300, the data processing model 301 (e.g., data processing module 112 from FIG. 1 or data processing module 206 from FIG. 2) may be allocated on a fog computing server 305 and the avatar generation model 303 (e.g., AI avatar generation agent module 116 from FIG. 1) may be allocated on a cloud server 307.

In some examples, the data processing model 309 may be allocated at a teleconferencing device, edge device, or cloud server corresponding to the first user 101. In some examples, the avatar generation model 311 may be allocated a teleconferencing device, edge device, or cloud server corresponding to the second user 103.

Figure 4A:
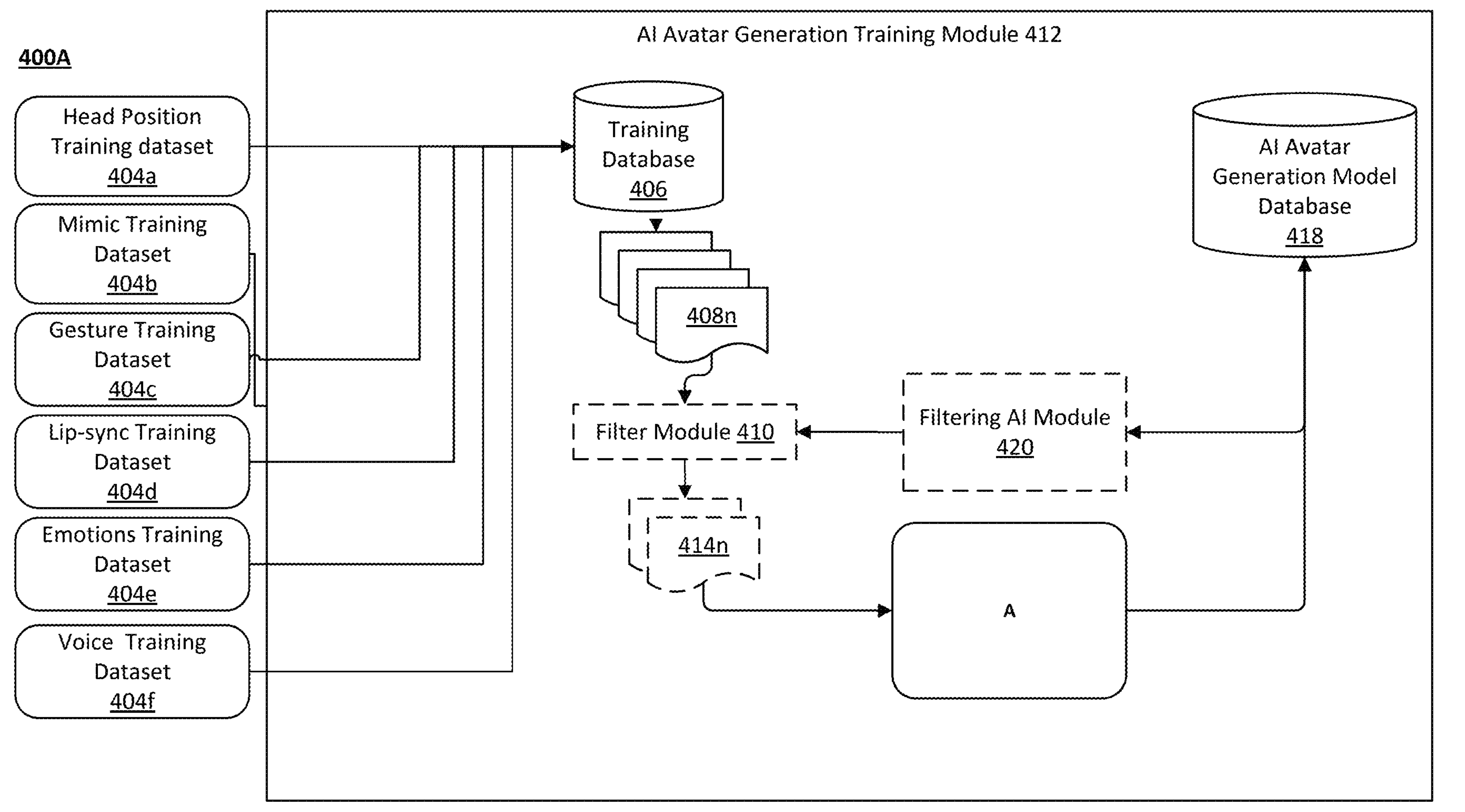
FIGS. 4A-4B are block diagrams illustrating a system for training neural networks to generate animated avatars of users according to aspects of the present disclosure.

FIG. 4*a* is a block diagram of a AI training pipeline according to aspects of the present disclosure. As shown in the example 400A in FIG. 4A, an AI Avatar Generation Training module 412 (e.g., AI avatar generation training module 114 shown in FIG. 1) is configured to build and train specialized AI recognition models with inference to predict and generate a visual appearance and characteristics of the first user 101 when speaking. This enables the trained specialized AI recognition models to develop an ability to predict and generate a real-time avatar of the first user 101 that is synced up with audio of the first user 101 using new audio and/or text messages of the first user 101 that are not part of a training dataset. By subjecting the specialized AI recognition models to large amounts of labeled trained image data sets, the specialized AI recognition models may detect and predict at least one of physical likeness, facial expressions, speech mannerisms, co-speech gestures, and voice of the first user 101 during the teleconference based on supervised or unsupervised learning.

Supervised learning is effective for tasks such as classification (assigning inputs to predefined categories) and regression (predicting continuous values) since it relies on the availability of labeled data for both training and evaluation phases. In supervised learning, the AI avatar generation training module 412 trains the algorithm on a labeled dataset, where each input has a corresponding output. The goal is to learn a mapping function from inputs to outputs, allowing the algorithm to make predictions or classifications on new, unseen data. The process typically involves the following steps: training, model building, prediction, feedback, and adjustment. In the training phase, the AI avatar generation training module 412 provides the algorithm with a training dataset including input-output pairs. The algorithm learns the mapping function that relates inputs to outputs through an iterative process, adjusting its internal parameters based on the provided examples. During model building, the algorithm creates a model that can generalize from the training data to make predictions on new, unseen data. The model's complexity varies based on the algorithm used. For example, the model may be a simple linear regression model or a complex neural network. During the prediction phase, the AI avatar generation training module 412 inputs test inputs (i.e., inputs with known outputs) into the model, which generates predictions or classifications based on what it has learned during training. The accuracy of predictions is evaluated by comparing them to the known outputs in a validation or test dataset. During the feedback and adjustment phase, the AI avatar generation training module 412 refines the model based on feedback from its predictions. If the predictions differ from the actual outputs, the algorithm adjusts its internal parameters to minimize the errors. The performance of the trained model is assessed using metrics such as accuracy, precision, recall, etc., depending on the nature of the problem.

In some aspects, the AI avatar generation training module 412 contains at least a training database 406 configured to store at least one of: a head position training dataset 404*a*, a mimic training dataset 404*b*, a gesture training dataset 404*c*, a lip-sync training dataset 404*d*, an emotions training dataset 404*e*, and a voice training dataset 404*f*, and an optional filter module 410 configured to filter data 408*n* from the training database 406 for training by removing bad training images.

Training data from the head position training dataset 404*a*, mimic training dataset 404*b*, gesture training dataset 404*c*, lip-sync training dataset 404*d*, emotions training dataset 404*e*, and/or voice training dataset 404*f* is received into the AI avatar generation training module 412. Each of the training datasets comprises a sequence of images, audio files, or videos and a respective label identifying a particular visual or audio characteristic of the user speaking.

An optional filter module 410 is configured to filter out bad training images in order to clean up the training data in the training dataset 408*n*. In some examples, the filter module 410 may be a neural network. In some examples, the filter module 410 is a simple mathematical model. In some examples, the cleaned training dataset 414*n* then undergoes optional preprocessing steps depending on which neural network or model is being trained.

Figure 4B:
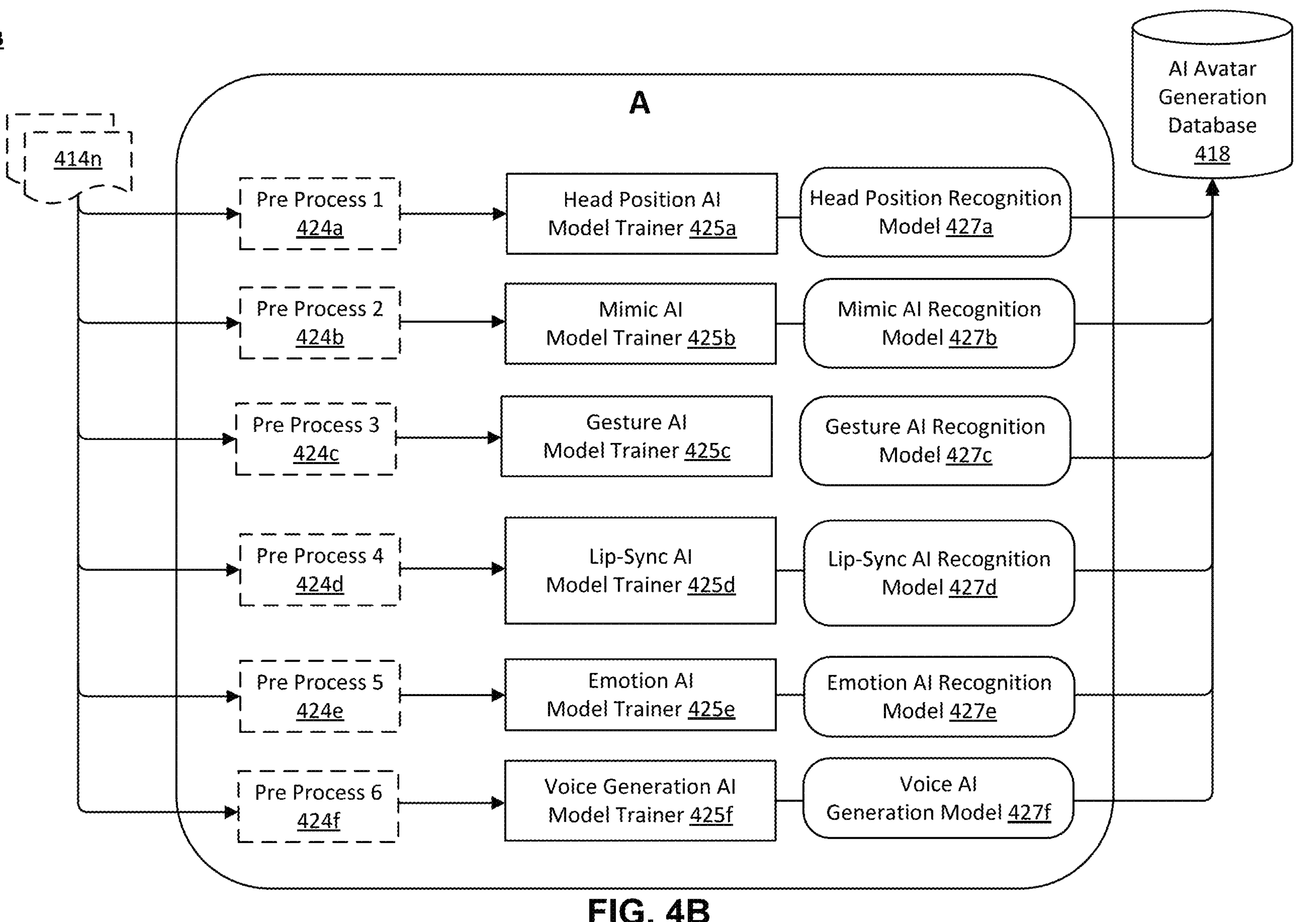

Example 400B of FIG. 4B shows a more detailed view of how the training dataset 408*n* (or the cleaned training dataset 414*n*) are used to train the various model trainers to generate respective AI recognition models for storage in the AI avatar generation database 418.

The optional preprocesses 1 424*a*, preprocess 2 424*b*, preprocess 3 424*c*, preprocess 4 424*d*, preprocess 5 424*e*, and/or preprocess 6 424*f* are automated preprocess that modify the raw data received from 408*n* (or cleaned training dataset 414*n*) and prepare the raw data as input to the respective model trainers (e.g., head position AI model trainer 425*a*, mimic AI model trainer 425*b*, gesture AI model trainer 425*c*, lip-sync AI model trainer 425*d*, emotional AI model trainer 425*e*, and/or voice generation AI model trainer 425*f*). These may be described in the AI avatar generation training module 412 or a data processing module (e.g., data processing module 112 from FIG. 1 or data processing module 206 from FIG. 2, or data processing model 301 or 309 from FIG. 3) as snippets of code that prepares the datasets. In some examples, the preprocessing modules (e.g., preprocesses 1 424*a*, preprocess 2 424*b*, preprocess 3 424*c*, preprocess 4 424*d*, preprocess 5 424*e*, and/or preprocess 6 424*f*) for a particular trainer may be an automated script or code that will be set up the first time any model is trained.

The head position AI model trainer 425*a*, mimic AI model trainer 425*b*, gesture AI model trainer 425*c*, lip-sync AI model trainer 425*d*, emotion AI model trainer 425*e*, and/or voice generation AI model trainer 425*f* are the scripts or code that train the model. For example, each model trainer may be a script or code that holds the instructions on how the model should be trained (e.g., optimization method, model architecture, dataset division, etc.) and also runs the training. The head position AI model trainer 425*a*, mimic AI model trainer 425*b*, gesture AI model trainer 425*c*, lip-sync AI model trainer 425*d*, emotion AI model trainer 425*e*, and/or voice generation AI model trainer 425*f* each take as input the raw or filtered processed training data and train its respective head position recognition model 427*a*, mimic AI recognition model 427*b*, gesture AI recognition model 427*c*, lip-sync AI recognition model 427*d*, emotion AI recognition model 427*e*, and/or voice AI generation model 427*f* to achieve their specific objectives (e.g., as listed above in detail in FIGS. 1 and 2). In summary, the raw dataset 408*n* or cleaned dataset 414*n* may optionally go through different preprocessing steps 424*a*, 424*b*, 424*c*, 424*d*, 424*e*, and 424*f* and then a corresponding model trainer.

As explained above in the AI avatar generation training module 412 from FIG. 1, an AI recognition model is essentially a complex mathematical function. The AI recognition models are designed using a set of hyperparameters that define high-level aspects of their architecture and training process. These hyperparameters include, but are not limited to a combination of architecture type, number of layers, memory size, number of attention heads, learning rate, batch size, optimization algorithm, and the like. Based on these hyperparameters, learnable variables called parameters are initialized, which define the mathematical function that the neural network represents.

The raw training dataset 408*n* used for training may contain noise and bad training images from the training database 406. Accordingly, to create a clean and filtered training dataset, the optional filter module 410 is configured to filter out unwanted data points from the raw training dataset 408*n* by developing smaller, less accurate systems based on patterns and metadata information. The resulting training dataset 414*n* may consist of images and labels, where each image is labeled with a corresponding label for the particular function and objective of the training dataset.

During the training process, the head position AI model trainer 425*a*, mimic AI model trainer 425*b*, gesture AI model trainer 425*c*, lip-sync AI model trainer 425*d*, emotional AI model trainer 425*e*, and/or voice generation AI model trainer 425*f* are presented with images, audio files, videos and corresponding labels, and the optimization objective, which aims to minimize the difference between the actual value and the predicted value, is calculated. The optimization algorithm updates the parameters of the head position AI model trainer 425*a*, mimic AI model trainer 425*b*, gesture AI model trainer 425*c*, lip-sync AI model trainer 425*d*, emotional AI model trainer 425*e*, and/or voice generation AI model trainer 425*f* to reduce the value of the objective. This process is repeated for several iterations until the parameters do not change anymore. This process is repeated for various combinations of hyperparameters, and the model with the smallest label prediction error is selected as the final model.

When a new model (e.g., a trained head position recognition model 427*a*, a mimic AI recognition model 427*b*, a gesture AI recognition model 427*c*, a lip-sync recognition model 427*d*, an emotion AI recognition model 427*e*, and/or a voice AI recognition model 427*f*) is created, and a new process for filtering and automated labeling is established, it is added to the AI Avatar Generation model database 418 in the AI avatar generation training module 412. This enables the new model to be part of the closed-loop model update process. Optionally, at regular intervals, data which is continuously collected can be filtered, labeled, and used to update old models by an optional filtering AI module 420. In some examples, the filtering AI module 420 may be a neural network. In some examples, the filtering AI module 420 is a simple mathematical model. This approach may capture changes in the appearance or voice of the first user over time.

Figure 5A:
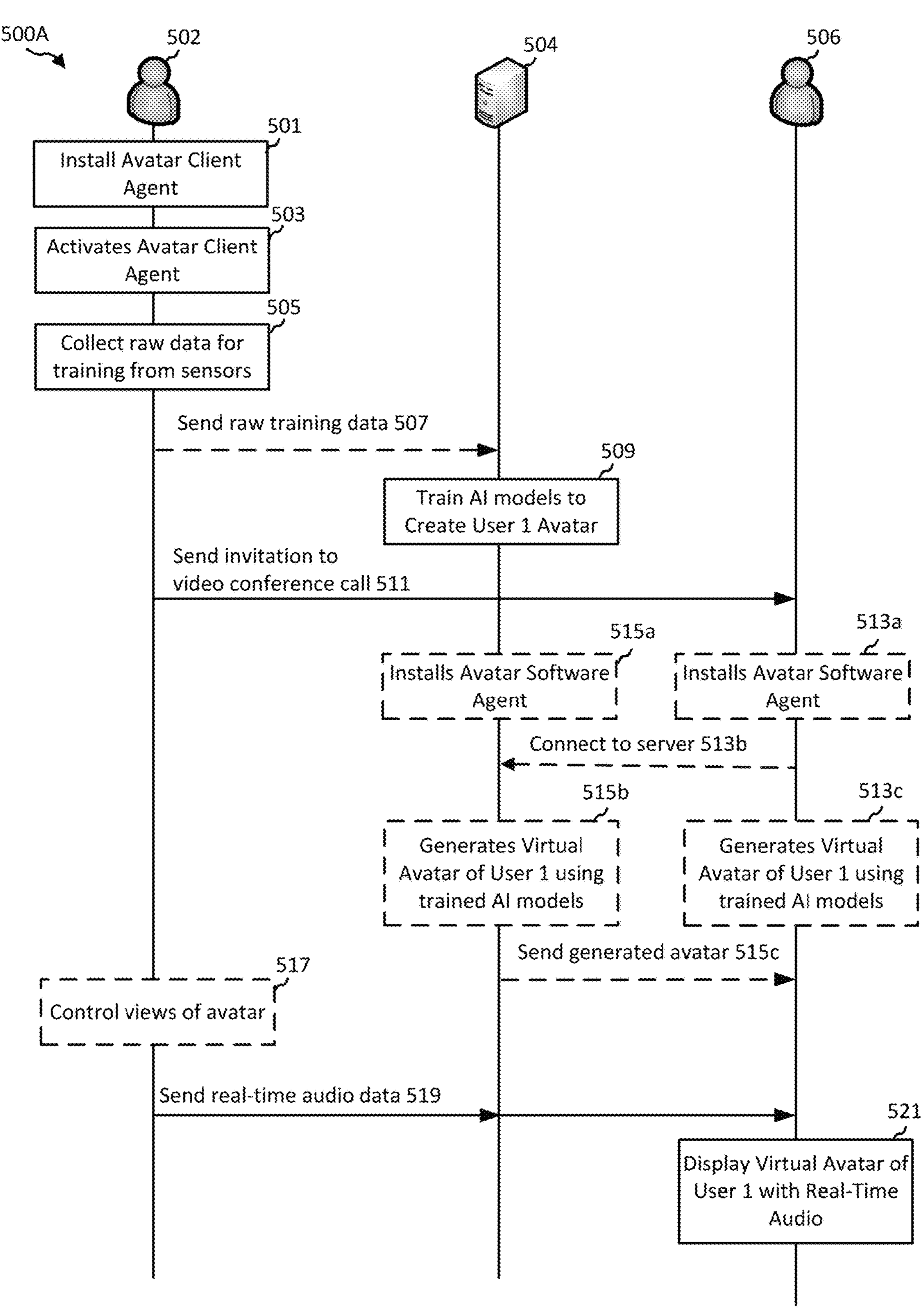
FIGS. 5A-5B are call flow diagrams between user devices and a cloud server.

FIG. 5A is a call flow 500A diagram between user devices 502, 506 and a cloud server 504. A call flow 500A illustrates an exemplary sequence of operations performed between a user device (e.g., computing device 104) for a first user, a cloud server 504, and a user device (e.g., computing device 106) for a second user. For example, call flow 500*a* depicts operations for generating, for display to a second user device 506, a realistic third person view of an animated avatar of the first user synched to real-time audio of the first user using multiple data streams from various sensors. It is understood that one or more of the operations described in call flow 500A may be performed earlier or later in the process, omitted, replaced, supplemented, or combined with another operation. Also, additional operations described herein that are not included in call flow 500A may be included in call flow 500A.

Figure 7:
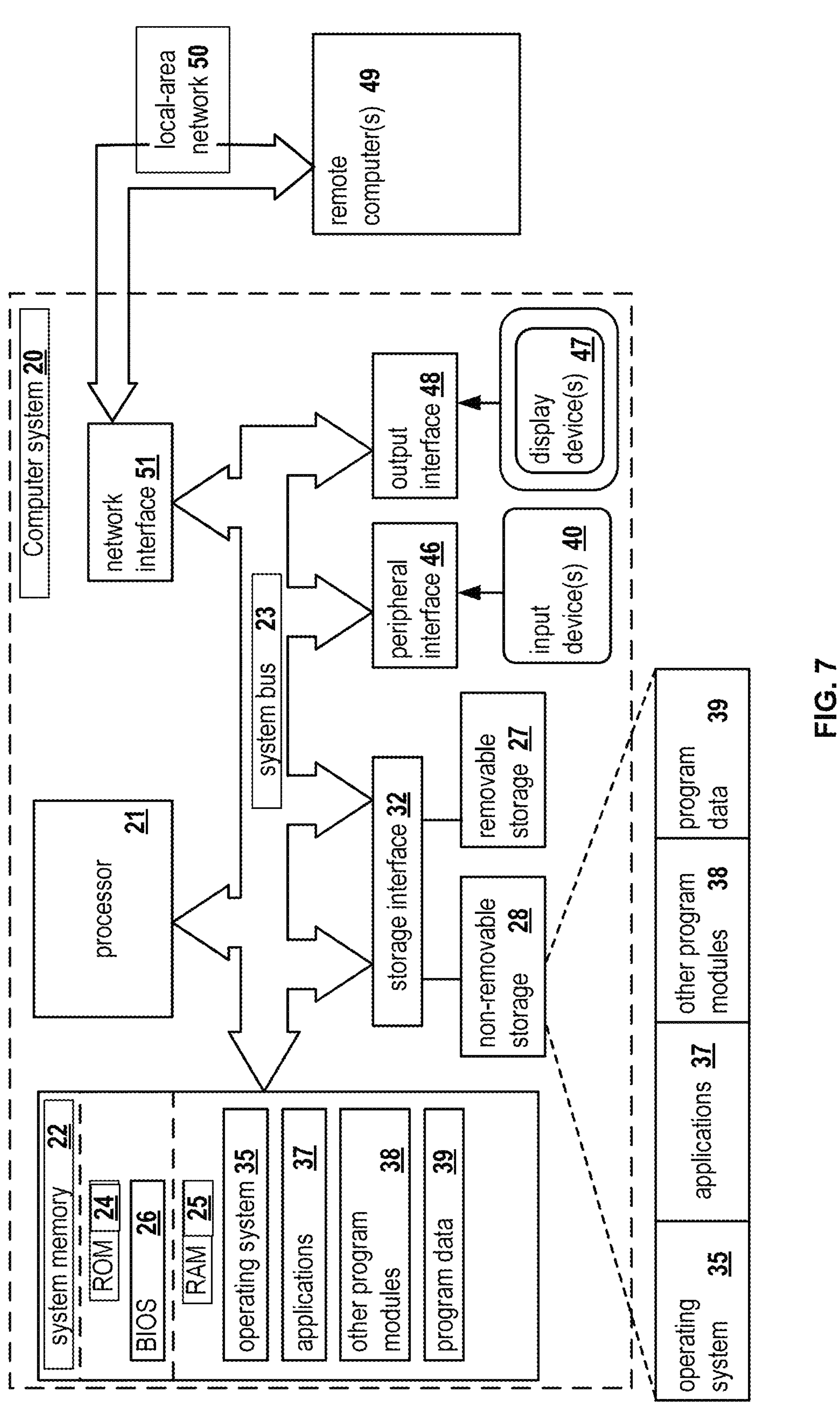
FIG. 7 presents an example of a general-purpose computer system on which aspects of the present disclosure can be implemented.

The first user device 502 and the second user device 506 may correspond to computing devices 104 and 106, respectively and computer system (e.g., computer system 20 from FIG. 7).

At 501, the first user device 502 installs (or access a cloud server to install) an avatar client agent.

At 503, the first user device 502 activates the avatar client agent. The avatar client agent may activate and train the AI models deployed on a cloud server 504 for creating a realistic animated avatar of the first user (e.g., speaker) using the first user device 502.

At 505, the first user device 502 collects raw data for training from the various sensors associated with the first user.

At 507, the first user device 502 transmits the raw training data to a cloud server 504.

At 509, the cloud server 504 trains the AI models to create a realistic animated avatar of user 1 based on the raw training data.

At 511, the first user device 502 sends an invitation to the second user device 506 for joining a video conference call. The invitation may include a link or installation package for the second user to install the avatar software agent.

At 513*a*, the second user device 506 installs the avatar software agent directly on the user device. At 513*b*, the second user device 506 connects to the server to access the trained AI models. At 513*c*, the second user device 506 generates an animated virtual avatar of the first user using the trained AI models and based on the accessible data streams from the first user.

Alternatively, at 515*a*, the cloud server installs the avatar software agent on the cloud server. At 515*b*, the cloud server generates an animated virtual avatar of the first user using the trained AI models stored on the cloud server 504 and based on the accessible data streams from the first user. At 515*c*, the cloud server sends the generated avatar to the second user device 506.

Optionally, at 517, the first user device 502 controls views (e.g., angle, frontal, etc.) of the animated avatar for display on the second user device 506.

At 519, the first user device captures and sends real-time audio data of the first user to the second device 506 for syncing with the animated avatar.

At step 521, the second user device 506 displays the virtual animated avatar of the first user synced with real-time audio of the first user.

It should be understood that the specific messages and the number of repetitions used in call flow 500A diagram is non-limiting should be illustrative only.

Figure 5B:
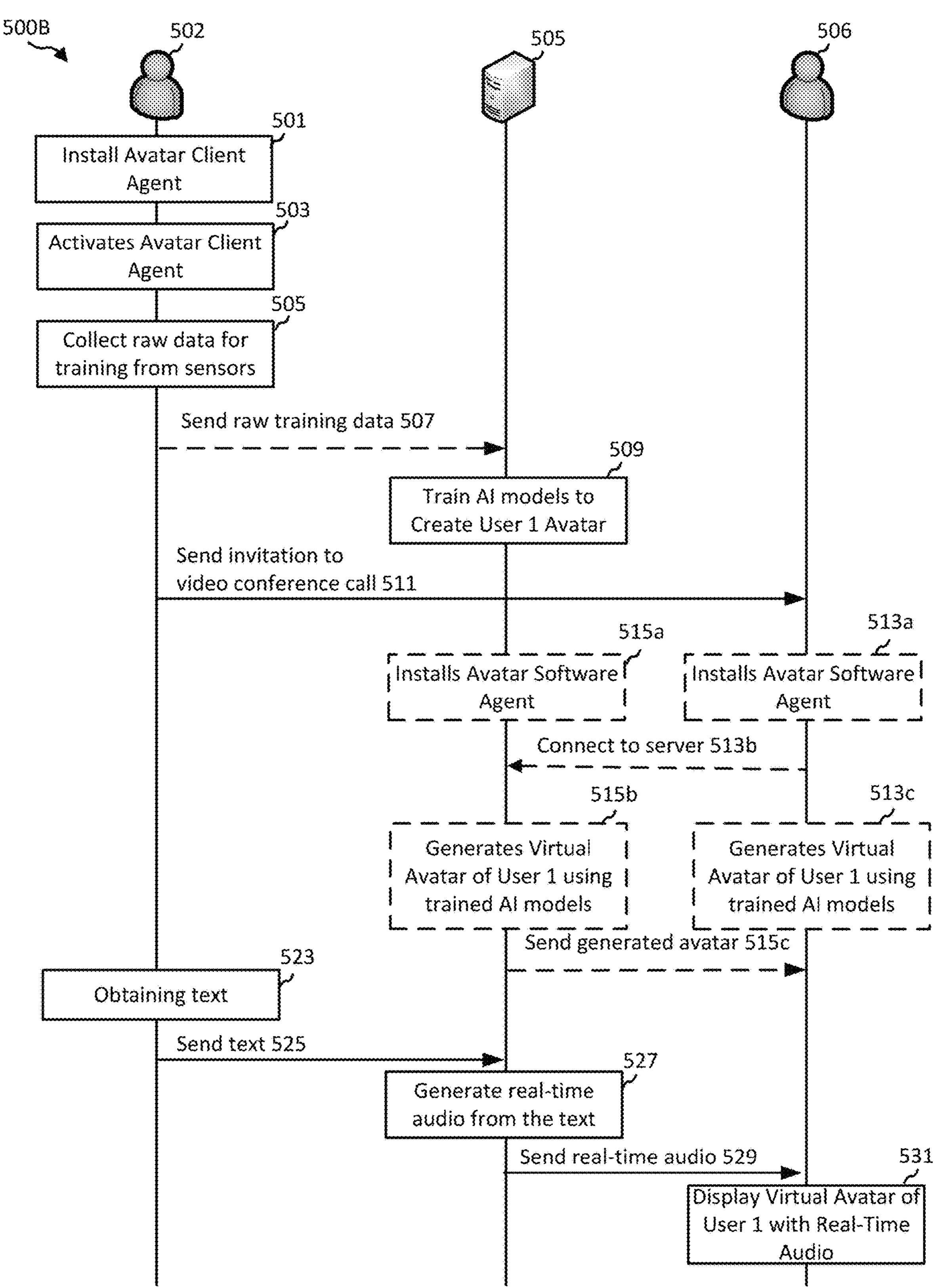

FIG. 5B is a call flow 500B diagram between user devices 502, 506 and a cloud server 504. A call flow 500B is similar to call flow 500A from FIG. 5A with similar steps 501-515*c*. Accordingly, steps 501-515*c* will not be repeated in detail here. Call flow 500B depicts an alternative embodiment where the first user does not transmit audio speech but, instead, is transmitting text messages such as in a chat room. In this way, the text may be recognized as "speech" of the first user and then speech is generated from the text using the trained AI models.

At 523, the first user device 502 captures, obtains, and recognizes text from the first user. For example, the first user may be typing messages in real-time similar to a chat message.

At 525, the first user device 502 transmits the text to the cloud server 504 to generate speech from the text.

At 527, the cloud server 504 generates real-time audio from the text. In some examples, a voice generation model (voice generation model 208*f* from FIGS. 1-2) is trained to predict and generate speech of the first user based on using a text-to-speech (TTS) model and audio files of the first user. The TTS model is configured to generate speech from text and enables machines to "speak" in a natural and intelligible manner. The TTS model may include at least text analysis for linguistic processing to convert written text into a form that can be spoken (e.g., expanding abbreviations, numbers, or special characters and analyze the grammatical structure of the text to determine the correct pronunciation and prosody (intonation, stress, and rhythm); phonetic analysis for converting the normalized text into a sequence of phonemes; prosody generation for determining an appropriate pitch, duration, and intensity for each phoneme to produce natural-sounding speech, and/or a waveform synthesis configured to convert the phonetic and prosodic information into an audio waveform that can be played back as speech. It should be noted that any type of TTS model or framework known in the art may be utilized in example 500B.

At 529, the cloud server 504 transmits the computer-generated real-time audio of the first user to the second user device 506.

At 531, the second user device 506 displays the animated virtual avatar of the first user with the computer-generated real-time audio of the first user such that the animated virtual avatar appears to be speaking.

It should be understood that the specific messages and the number of repetitions used in call flow 500B diagram is non-limiting should be illustrative only.

Figure 6A:
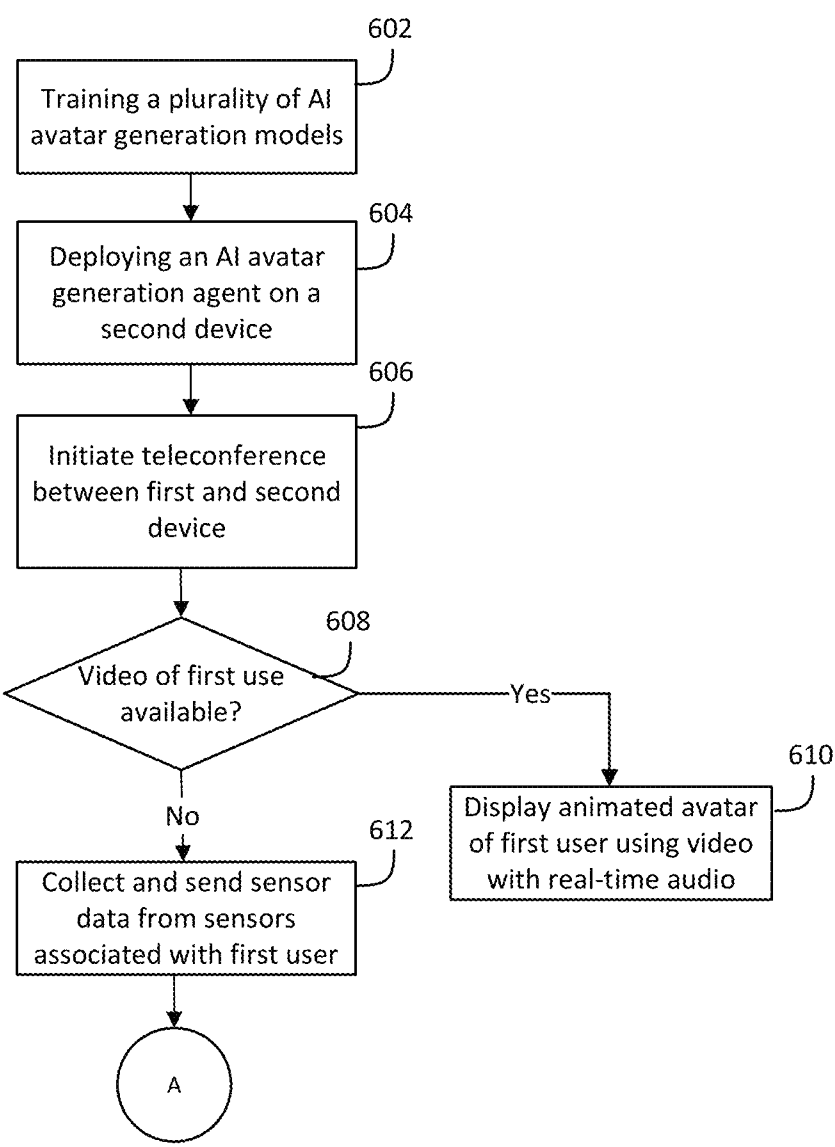
FIGS. 6A-6B are flow diagrams of a method for generating animated avatars of users in real-time during a teleconference according to aspects of the present disclosure.
Figure 6B:
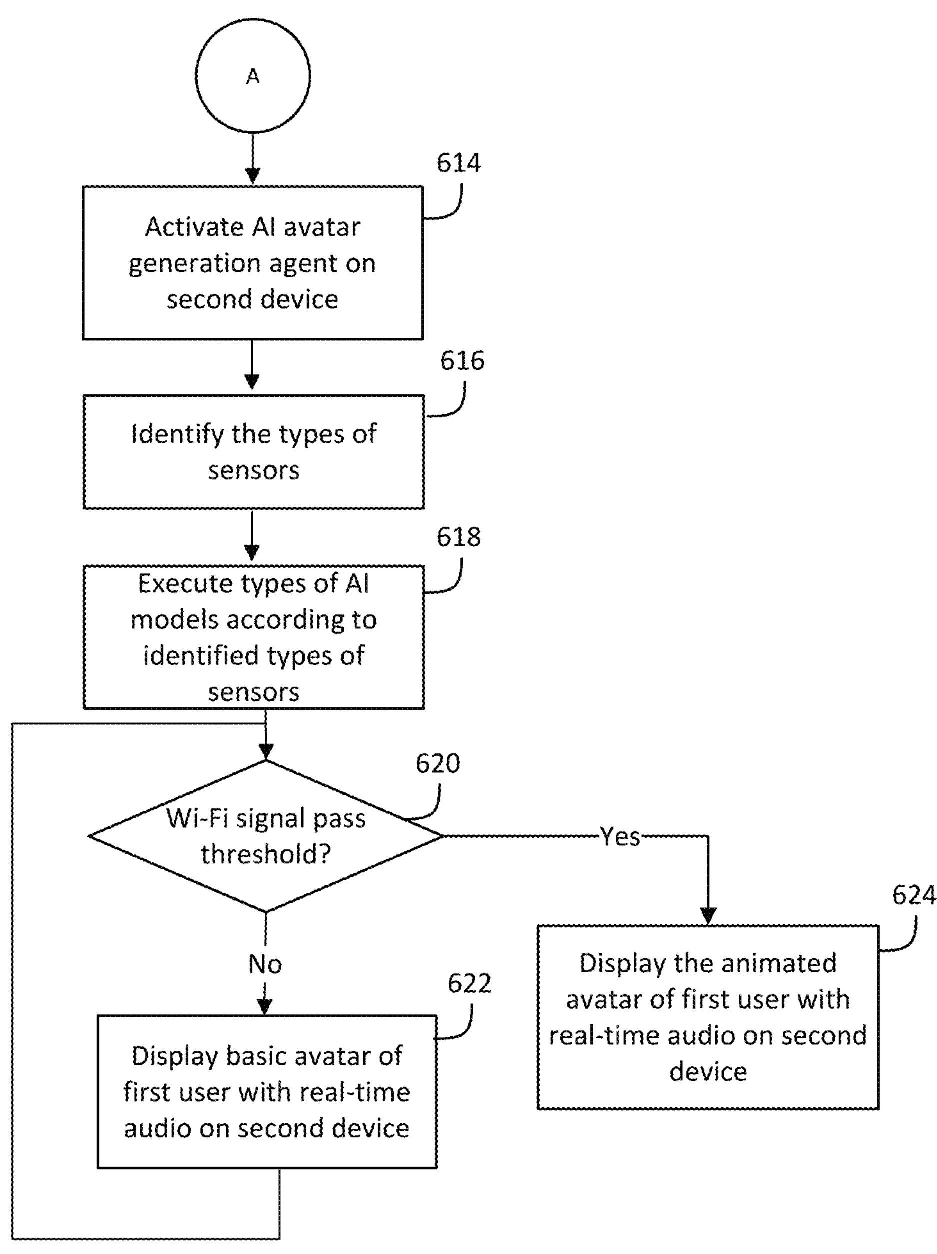

FIG. 6A-B show a flow diagram of method for generating animated avatars of users in real-time during a teleconference. In various implementations, the method 600 is performed by a device with one or more processors and non-transitory memory that performs intent prediction. In some implementations, the method 600 is performed by processing logic, including hardware, firmware, software, or a combination thereof. In some implementations, the method 600 is performed by a processor executing code stored in a non-transitory computer-readable medium (e.g., a memory). The method 600 describes generating a realistic animated avatar of the first user (e.g., speaker) for display to a second user such that the real-audio of the first user is synced to the animation of the animated avatar during a teleconference.

At 602, the method 600 includes training a plurality of AI avatar generation models for a first user (e.g., speaker) based on data obtained by various sensors and computing device of the first user. More detail about how the AI avatar generation models are trained are provided in FIGS. 1 and 2.

At 604, the method 600 includes deploying an AI avatar generation agent on a second user device for a second user (e.g., listener).

At 606, the method 600 may include initiating a teleconference between a first user device and a second user device.

At 608, the method 600 may include determining whether video or camera streaming video content of the first user is available for use in the teleconference. If it is determined that there are cameras that may capture the first user while speaking or streaming video content of the first user is available, then, at step 610, the method 600 includes displaying animated avatar of the first user using video with real-time audio.

If it is determined that there are no cameras available to capture the first user while speaking or to stream video content of the first user, then, at step 612, the method 600 includes collecting and sending sensor data from sensors associated with the first user. In this way, various sensors replace a camera by creating a real-time animated avatar from the various sensor feeds.

At step 614, the method 600 may include activating the AI avatar generation agent (e.g., AI avatar generation agent module 116 from FIG. 1) on the second device.

At step 616, the method 600 may include identifying the types of sensors available to the first user. In some examples, a data processing module (e.g., data processing module 112 from FIG. 1, data processing module 206 from FIG. 2, data processing model 301 and 309 from FIG. 3) may be configured to identify the types of sensors available to the first user and available for predicting the visual and/or audio characteristics of the first user.

At step 618, the method 600 may include selecting and executing the types of AI models according to the identified types of sensors that are available. For example, a particular sensor feed may have bad quality and so this type of data is omitted and, instead, other feeds may be used to supplement the bad quality feed.

At step 620, the method 600 may include determining whether a Wi-Fi signal passes a threshold. Based on a determination, that the Wi-Fi signal does not pass a threshold, then, at step 622, the method 600 includes displaying a basic avatar of the first user (e.g., not animated) with real-time audio on the second device. Once the Wi-Fi signal passes the threshold, then the basic avatar of the first user may be upgraded to an animated avatar of the first user.

Based on a determination that the Wi-Fi signal passes a threshold, then, at step 624, the method 600 includes displaying the animated avatar of the first user with real-time audio on the second device.

FIG. 7 is a block diagram illustrating a computer system 20 on which aspects of systems and methods for synchronizing race telemetry, video, and map data may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-7 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for generating animated avatars of users in real-time during a teleconference, the method comprising:

training a plurality of AI avatar generation models to create an avatar of a first user, wherein each AI avatar generation model is trained using different types of sensor data;

deploying an AI avatar generation agent on a communication device of a second user or on a cloud server;

in response to a teleconference call being initiated between a communication device of the first user and a communication device of the second user, collecting sensor data from a plurality of different sensors associated with the first user, wherein the sensor data comprises at least real-time audio of voice of the first user;

activating a data processing model to identify the types of sensor data received from the communication device of the first user and activating the AI avatar generation agent to execute one or more of the plurality of AI avatar generation models, corresponding to the identified types of sensor data, for generating, based at least on the received sensor data, an animated avatar of the first user, wherein the animated avatar simulates at least one of: physical likeness, facial expressions, speech mannerisms, co-speech gestures, and voice of the first user during the teleconference; and displaying, on the communication device of second user, the animated avatar of the first user synced with the real-time audio of the voice of the first user during the teleconference.

2. The method of claim 1, wherein the plurality of different sensors comprises one or more of:

a wearable sensor configured to measure a head position or a head movement of the first user, a wearable sensor with interior-facing cameras configured to capture face movement or lip-sync movement of the first user, a wearable Wi-Fi signal strength measurement device configured to measure Wi-Fi strength in accordance with gestures of the first user, a microphone configured to capture the real-time audio of the voice of the first user, and an input device configured to capture text from the first user.

3. The method of claim 2, wherein the plurality of AI avatar generation models to generate the animated avatar of the first user comprises at least one or more of:

a head position AI recognition model to predict a head position or head movement of the first user based on using the wearable sensor to measure the head position of the first user in relation with a body of the first user when the first user is speaking, wherein the head position AI recognition model is trained to predict the head position using a head position training set comprising of a sequence of images of users speaking and a head position label identifying each head position in the sequence of images;

a mimic AI recognition model to predict facial expressions or lip-sync of the first user based on using the wearable sensor with interior-facing cameras to capture face movement when the first user is speaking, wherein the mimic AI recognition model is trained to predict the facial expressions of the first user using a mimic head position training set comprising of a sequence of images of users speaking and a facial expression label identifying a facial expression in the sequence of images;

a gesture AI recognition model to predict gestures of the first user based on using the wearable Wi-Fi signal strength measurement device to detect changes in a Wi-Fi field around the first user when the first user is speaking, wherein the gesture AI recognition model is trained to predict the gestures of the first user using a gesture training set comprising of a sequence of images of users and a gesture label identifying a gesture in the sequence of images;

a lip-sync AI recognition model to predict a lip-sync of the first user based on using the wearable sensor with interior-facing cameras or the microphone to detect speech patterns when the first user is speaking, wherein the lip-sync AI recognition model is trained to predict lip-sync of the first user using audio files matched to sequence of images of users and a lip-sync label identifying a lip-sync movement audio files matched to the sequence of images; or an emotion AI recognition model to predict emotions of the first user based on using the microphone to capture the voice of the first user, wherein the emotion AI recognition model is trained to predict emotions of the first user using audio files of users and an emotion label identifying an emotion in the audio files; or a voice generation model to generate computer-generated speech for the first user based on using text obtained from an input device of the first user in real-time, wherein the voice generation model is trained to predict speech of the first user using audio files of the first user and a text-to-speech (TTS) model.

4. The method of claim 1, wherein the plurality of AI avatar generation models are trained, stored, and executed on the cloud server.

5. The method of claim 1, wherein the plurality of AI avatar generation models are trained, stored, and executed on a wearable device, invasive implant, non-invasive implant, teleconference device, or edge device.

6. The method of claim 1, further comprising:

based on a determination that a Wi-Fi strength of a wearable Wi-Fi signal strength measurement device of the first user does not pass a threshold, displaying, on the communication device of the second user, a basic avatar of the first user without animations along with the real-time audio of the voice of the first user during the teleconference.

7. The method of claim 6, further comprising:

based on a determination that the Wi-Fi strength of the wearable Wi-Fi signal strength measurement device of the first user passes the threshold, updating, on the communication device of the second user, the display of the basic avatar to a display of the animated avatar of the first user along with the real-time audio of the voice of the first user during the teleconference.

8. The method of claim 1, wherein the speech mannerisms comprises one or more of: frequency of pauses, length of the pauses, talking speed, tone, or diction.

9. The method of claim 1, wherein the co-speech gestures comprises at least head movement, facial feature movement, gestures, lip-sync movement, and body part movement of the first user.

10. The method of claim 1, wherein the voice comprise at least one of gender, tone, emphasis, emotions, speech defects, and prosody of the first user.

11. The method of claim 1, wherein based on one or more types of sensor data not being available from the communication device of the first user, the AI avatar generation agent uses one or more of the AI avatar generation models to predict the one or more of the physical likeness, facial expressions, speech mannerisms, co-speech gestures, and audio of the first user based on available sensor data or previously collected sensor data.

12. The method of claim 1, further comprising:

collecting the sensor data from a plurality of different sensors associated with the first user and sending the collected sensor data to the AI avatar generation agent based on a determination that a video of the first user is not available.

13. The method of claim 1, wherein the data processing model is deployed on a cloud fog and the AI avatar generation agent are deployed on a cloud.

14. A method for generating animated avatars of users in real-time during a teleconference, the method comprising:

training a plurality of AI avatar generation models to create an avatar of a first user, wherein each AI avatar generation model is trained using different types of sensor data;

deploying an AI avatar generation agent on a cloud server;

in response to a teleconference call being initiated between a communication device of the first user and a communication device of the second user, collecting sensor data from a plurality of different sensors associated with the first user, wherein the sensor data comprises at least text from the first user;

activating a data processing model and of the second user to identify the types of sensor data received from the communication device of the first user and activating the AI avatar generation agent to execute one or more of the plurality of AI avatar generation models, corresponding to the identified types of sensor data, for generating, based at least on the received sensor data, an animated avatar of the first user, wherein the animated avatar simulates at least one of: physical likeness, facial expressions, speech mannerisms, co-speech gestures, and voice of the first user during the teleconference, wherein the one or more of the plurality of AI avatar generation models comprises at least a voice generation model configured to generate computer-generated speech for the first user from text of the first user using the AI avatar generation agent on the cloud server; and displaying, on the communication device of second user, the animated avatar of the first user with the computer-generated speech for the first user synced with the text obtained from the first user in real-time during the teleconference.

15. A system for generating animated avatars of users in real-time during a teleconference, comprising:

at least one memory; and at least one hardware processor coupled with the at least one memory and configured, individually or in combination, to:

train a plurality of AI avatar generation models to create an avatar of a first user, wherein each AI avatar generation model is trained using different types of sensor data;

deploy an AI avatar generation agent on a communication device of a second user or on a cloud server;

in response to a teleconference call being initiated between a communication device of the first user and a communication device of the second user, collect sensor data from a plurality of different sensors associated with the first user, wherein the sensor data comprises at least real-time audio of voice of the first user;

activate a data processing model to identify the types of sensor data received from the communication device of the first user and activating the AI avatar generation agent to execute one or more of the plurality of AI avatar generation models, corresponding to the identified types of sensor data, for generating, based at least on the received sensor data, an animated avatar of the first user, wherein the animated avatar simulates at least one of: physical likeness, facial expressions, speech mannerisms, co-speech gestures, and voice of the first user during the teleconference; and display, on the communication device of second user, the animated avatar of the first user synced with the real-time audio of the voice of the first user during the teleconference.

16. The system of claim 15, wherein the plurality of different sensors comprises one or more of:

a wearable sensor configured to measure a head position or a head movement of the first user, a wearable sensor with interior-facing cameras configured to capture face movement or lip-sync movement of the first user, a wearable Wi-Fi signal strength measurement device configured to measure Wi-Fi strength in accordance with gestures of the first user, a microphone configured to capture the real-time audio of the voice of the first user, and an input device configured to capture text from the first user.

17. The system of claim 16, wherein the plurality of AI avatar generation models to generate the animated avatar of the first user comprises at least one or more of:

a head position AI recognition model to predict a head position or head movement of the first user based on using the wearable sensor to measure the head position of the first user in relation with a body of the first user when the first user is speaking, wherein the head position AI recognition model is trained to predict the head position using a head position training set comprising of a sequence of images of users speaking and a head position label identifying each head position in the sequence of images;

a mimic AI recognition model to predict facial expressions or lip-sync of the first user based on using the wearable sensor with interior-facing cameras to capture face movement when the first user is speaking, wherein the mimic AI recognition model is trained to predict the facial expressions of the first user using a mimic head position training set comprising of a sequence of images of users speaking and a facial expression label identifying a facial expression in the sequence of images;

a gesture AI recognition model to predict gestures of the first user based on using the wearable Wi-Fi signal strength measurement device to detect changes in a Wi-Fi field around the first user when the first user is speaking, wherein the gesture AI recognition model is trained to predict the gestures of the first user using a gesture training set comprising of a sequence of images of users and a gesture label identifying a gesture in the sequence of images;

a lip-sync AI recognition model to predict a lip-sync of the first user based on using the wearable sensor with interior-facing cameras or the microphone to detect speech patterns when the first user is speaking, wherein the lip-sync AI recognition model is trained to predict lip-sync of the first user using audio files matched to sequence of images of users and a lip-sync label identifying a lip-sync movement audio files matched to the sequence of images; or an emotion AI recognition model to predict emotions of the first user based on using the microphone to capture the voice of the first user, wherein the emotion AI recognition model is trained to predict emotions of the first user using audio files of users and an emotion label identifying an emotion in the audio files; or a voice generation model to generate computer-generated speech for the first user based on using text obtained from an input device of the first user in real-time, wherein the voice generation model is trained to predict speech of the first user using audio files of the first user and a text-to-speech (TTS) model.

18. The system of claim 15, wherein the plurality of AI avatar generation models are trained, stored, and executed on the cloud server.

19. The system of claim 15, wherein the plurality of AI avatar generation models are trained, stored, and executed on a teleconference device or edge device.

20. The system of claim 15, based on one or more types of sensor data not being available from the communication device of the first user, the AI avatar generation agent uses one or more of the AI avatar generation models to predict the one or more of the physical likeness, facial expressions, speech mannerisms, co-speech gestures, and audio of the first user based on available sensor data or previously collected sensor data.

* * * * *